US009680668B2

(12) United States Patent
Laufer et al.

(10) Patent No.: US 9,680,668 B2
(45) Date of Patent: Jun. 13, 2017

(54) DELAY RESILIENT DECISION FEEDBACK EQUALIZER

(71) Applicant: Intel Corporation, Santa Clara, CA (US)

(72) Inventors: Amir Laufer, Petach Tiqwa (IL); Itamar Levin, Holon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/572,756

(22) Filed: Dec. 16, 2014

(65) Prior Publication Data

US 2016/0173300 A1 Jun. 16, 2016

(51) Int. Cl.
H03K 5/159 (2006.01)
H04L 25/03 (2006.01)

(52) U.S. Cl.
CPC .. *H04L 25/03057* (2013.01); *H04L 25/03885* (2013.01)

(58) Field of Classification Search
CPC ............................ H04B 7/0417; H04B 7/0647
USPC ........................................................ 375/233
See application file for complete search history.

(56) References Cited

U.S. PATENT DOCUMENTS

| 5,748,674 | A  | * | 5/1998  | Lim ............................. 375/233 |
| 6,754,294 | B1 | * | 6/2004  | Adireddy .......... H04L 25/03057 375/229 |
| 7,212,569 | B1 | * | 5/2007  | Clark ........................... 375/233 |
| 8,416,846 | B1 | * | 4/2013  | Lin et al. ....................... 375/233 |
| 8,654,830 | B1 | * | 2/2014  | Lin et al. ....................... 375/233 |
| 2002/0181575 | A1 |   | 12/2002 | Birru |
| 2005/0078746 | A1 | * | 4/2005  | Lin et al. ....................... 375/233 |
| 2005/0111539 | A1 |   | 5/2005  | Tsuchiya |
| 2005/0207485 | A1 | * | 9/2005  | Lai ................................ 375/233 |
| 2005/0271169 | A1 |   | 12/2005 | Momtaz et al. |
| 2006/0109940 | A1 |   | 5/2006  | Beukema et al. |
| 2008/0069198 | A1 | * | 3/2008  | Bhoja et al. ................... 375/233 |
| 2008/0187037 | A1 | * | 8/2008  | Bulzacchelli ............ H03K 5/02 375/233 |
| 2009/0067486 | A1 | * | 3/2009  | Casas et al. ................... 375/233 |

(Continued)

FOREIGN PATENT DOCUMENTS

JP 2005159467 6/2005

OTHER PUBLICATIONS

International Search Report and Written Opinion for International Application No. PCT/US2015/060440, mailed on Feb. 22, 2016.

*Primary Examiner* — Santiago Garcia
(74) *Attorney, Agent, or Firm* — Green, Howard & Mughal LLP

(57) ABSTRACT

Described is an apparatus which comprises a decision feedback equalizer (DFE) having a first DFE tap path and non-first DFE tap paths, wherein the DFE includes a variable delay circuit in a signal path of the non-first DFE tap paths. In some embodiment, an apparatus is provided which comprises: a summer; a slicer to receive input from the summer; a first feedback loop to cancel a first post-cursor, the first feedback loop forming a loop by coupling the slicer to the summer; and a second feedback loop to cancel a second post-cursor, the second feedback loop forming a loop by coupling an input of the first feedback loop to the summer, wherein the second feedback loop having a programmable delay at its input.

24 Claims, 9 Drawing Sheets

(56) References Cited

U.S. PATENT DOCUMENTS

| | | | |
|---|---|---|---|
| 2010/0046683 A1* | 2/2010 | Beukema | H04L 7/0062 |
| | | | 375/355 |
| 2010/0104000 A1* | 4/2010 | Pozzoni | 375/233 |
| 2010/0202506 A1* | 8/2010 | Bulzacchelli et al. | 375/233 |
| 2010/0238993 A1* | 9/2010 | Huang et al. | 375/233 |
| 2010/0316112 A1* | 12/2010 | Huang et al. | 375/233 |
| 2012/0020173 A1* | 1/2012 | Liu | 365/194 |
| 2012/0201289 A1 | 8/2012 | Abdalla et al. | |
| 2013/0021074 A1* | 1/2013 | Finn | H04L 25/03885 |
| | | | 327/162 |
| 2013/0346785 A1* | 12/2013 | Lossin et al. | 713/401 |
| 2014/0056345 A1* | 2/2014 | Dickson et al. | 375/233 |
| 2014/0140389 A1* | 5/2014 | Chen | 375/233 |

\* cited by examiner

US 9,680,668 B2

DELAY RESILIENT DECISION FEEDBACK EQUALIZER

BACKGROUND

As serial input/output (IOs) data rates increase to double digit Giga-bytes per second, more powerful equalization methods are required. This is due to the excessive Inter Symbol Interference (ISI) resulting from the properties of the channels carrying such high data rate signals. Examples of channel properties that may cause ISI include poor channel fabrication materials (e.g., FR4 Printed Circuit Boards (PCBs) for links over backplane), intermediate connectors, vias causing reflections and ringing, device packages causing impedance mismatch and reflections, etc.

Decision Feedback Equalizer (DFE) is a widely used apparatus for canceling the ISI generated by formerly transmitted symbols. As its names implies, the DFE takes the symbols that were already decoded, sums them with the right weighting and subtracts this amount from the signal that is presently being decoded. A major limitation of the DFE is related to timing requirements within its feedback loop.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
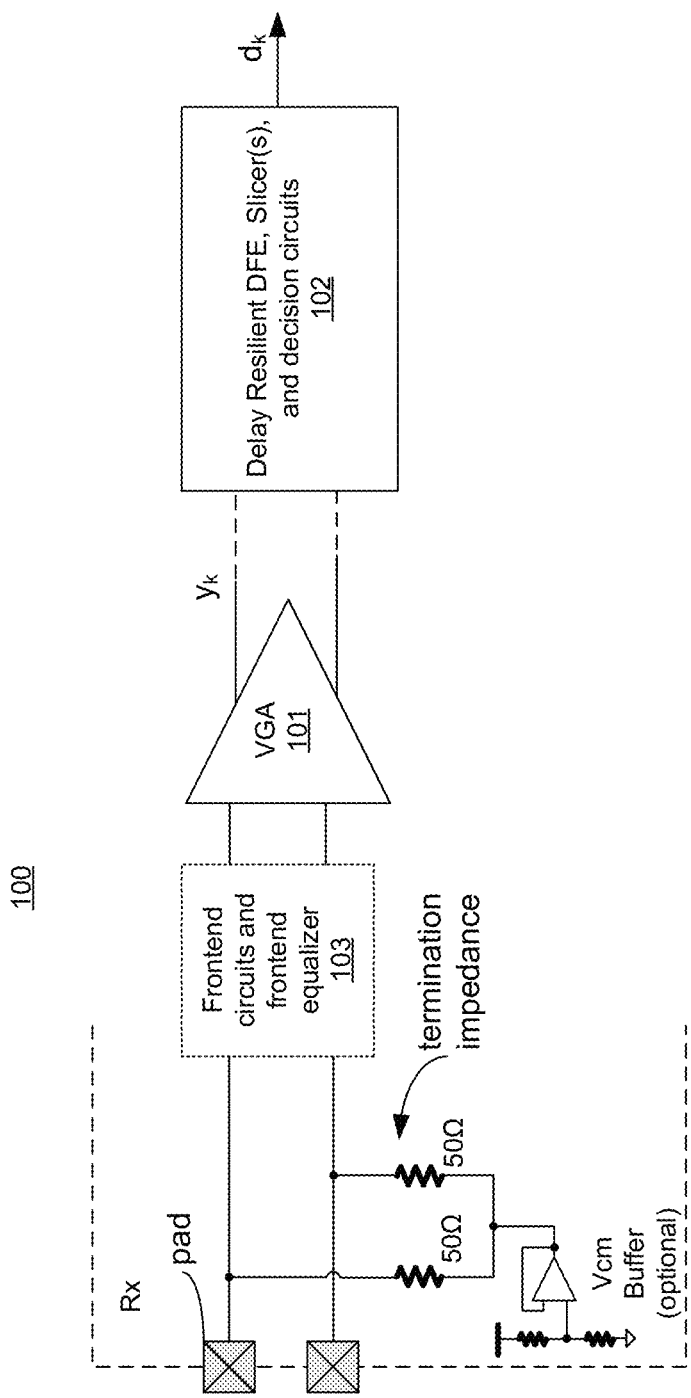
FIG. 1 illustrates a portion of a receiver having a delay resilient Decision Feedback Equalizer (DFE), according to some embodiments of the disclosure.

In a Decision Feedback Equalizer (DFE), complete cancellation of the Inter Symbol Interference (ISI) needs to take place before the decision on the current data symbol. Thus, for the sum of resolution time in the decision circuit, the propagation time in the decision circuit (e.g., 202 of FIG. 2), the propagation time in the DFE circuit (e.g., 204 and 205 of FIG. 2) and the propagation time in the subtractor (e.g., 201 and 206 of FIG. 2), eliminating the ISI needs to be smaller than the signalization interval required. All of these delays are usually voltage, temperature, and process (PVT) dependent delays. The resolution time in the decision circuit may also be signal dependent.

As ISI becomes more severe, more DFE taps are applied and more complex DFE arrangements appear in order to mitigate loading effects and to make the structure/design easier to implement (e.g., half rate, quarter rate, etc.). These DFE arrangement schemes are more complex to layout and it is harder to match timing between different DFE taps and different paths of the DFE.

One technique to mitigate some of the above issues is to use a half-rate DFE. A half-rate DFE may alleviate the timing constraint by a factor of 1.5 to 2. Speculative and Slewing DFE solutions, which either delay or fuzz the decision to allow more propagation time, can also mitigate some of the timing issues. A half-rate DFE may be typically used to realize the $1^{st}$ tap of the DFE, which may be the most difficult to implement. Time borrowing (i.e., delay of clock to the slicer or delay to clock in DFE latches/flops with respect to the data) is another technique used in order to ease the timing design. However, the use of time borrowing is PVT dependent and poses Setup/Hold timing violation risks, and may degrade the quality of the design.

Moreover, ensuring no timing violations across PVT variability requires overdesign even when using the above techniques. This makes meeting of the timing and performance constraints a challenge, especially with the rise in line rate in recent years.

Traditionally, only the first tap in a DFE arrangement was considered timing critical. However, in low voltage, modern Complementary Metal Oxide Semiconductor (CMOS) technology (due to its limitations in the available signal swing achievable in the receiver high speed path and the need to equalize bandwidth by load balancing of the circuit), DFE feedback may be introduced in several places. Using multiple DFE taps in conjunction with high speed input/output (JO) rates further makes it difficult to meet the timing requirement.

According to some embodiments, variable delay element (s) are introduced into the DFE delay structure or path. In some embodiments, the delay of the variable delay element (s) is adjusted via a feedback to achieve maximal performance. In some embodiments, the variable delay element(s) do not solve the first DFE tap critical timing loop, however, the variable delay element(s) have the capacity to ease timing design and eliminate overdesign required to tune and meet timing for all the other DFE taps. In some embodiments, compensation for timing variability is performed in a closed loop, continuous manner, which protects against voltage and timing variations.

If the feedback of the DFE is introduced at several locations (as sometimes beneficial in order to mitigate loading and signal peak-average issues), several delay units may be introduced, before or after the logical delay (e.g., implemented as a Flip-Flop) and tuned individually per DFE tap, according to some embodiments. This may also be useful as a means of simplifying layout and compensating for uneven routing and propagation delays between the DFE taps in more complex DFE arrangements such as half rate, quarter rate, etc. While various embodiments are exemplified using Non-Return to Zero (NRZ), other types of signaling may also be used. For example, in some embodiments, other modulation types like multi-level Pulse Amplitude Modulation (PAM) may be used. An example of multi-level PAM is 4-level PAM (PAM-4).

There are many technical effects of various embodiments. For example, some embodiments allow for much easier timing design and so lesser overdesign is required to close timing on DFE (i.e., no need to overdesign in order to compensate for PVT variability and mismatch-related delay skew) compared to traditional DFEs. Some embodiments allow for better utilization of DFE dynamic range since feedback signal slewing is allowed to complete. Some embodiments make it easier, compared to traditional DFEs, to layout and eliminate path delay matching by layout optimization.

Some embodiments allow for dynamic and on-line compensation for variability due to environmental conditions. The term "environmental conditions" generally refers to temperature and voltage conditions that may cause the same DFE to converge to different values at different times, since the slewing/settling (delay) is dependent on initial conditions. It may be generally important that the same DFE converges to the same values at different times so that the solution reached by the system is of high confidence (i.e., it is repeatable) which makes testing and conformance easier.

In some embodiments, the mechanism discussed also allows the DFE analog signal to completely settle and stabilize before the next symbol evaluation. As such, various embodiments do not depend on the settling transient in the undetermined time, but may depend on the fixed full swing signal that the DFE circuit dictates (which generally means more predictable and more repeatable operation). Various embodiments provide a closed loop solution rather than a pre-silicon tuning, factory trimming, or other one time tuning mechanisms.

In some embodiments, when subtracting the ISI in parts (e.g., using several summation points at the outputs of different receiver amplifier stages, in order to eliminate severe ISI and balance amplifier loading) as described with reference to FIG. 3B, the apparatus described can adaptively compensate for the amplifier voltage and temperature dependent delays. Some embodiments allow the receiver to satisfy the high IO data rate (e.g., rates exceeding 25 Giga Bytes Per Second (GBPS) or even 32-56 GBPS line rates) with lower DFE power consumption and less layout complexity levels than existing solutions. Various embodiments also provide better resilience against jitter effects, since the DFE taps are allowed more time to settle so that the decision is completed after settling (while the DFE signal is flat and not slewing). Other technical effects will be evident by the various embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, logical, or wireless connection between the things that are connected, without any intermediary devices. The term "coupled" means either a direct electrical or wireless connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal or logical signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The term "scaling" may also refer to scaling up or down the capability of a circuit, for example, scaling up or down a number of equalization elements, etc. (i.e. expansion or reduction of functional capability of the circuit). The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates portion 100 of a receiver (Rx) having a delay resilient DFE, according to some embodiments of the disclosure. In some embodiments, portion 100 comprises pad(s) for receiving input signal, termination impedance, variable gain amplifier (VGA) 101, and Delay Resilient DFE 102. In some embodiments, portion 100 includes frontend circuits and frontend equalizer 103. An example of a frontend equalizer is a forward feed through equalizer (not shown). While various embodiments are described with reference to differential signaling, the embodiments are also applicable to other types of signaling. For example, some embodiments are applicable to single-ended signaling, multi-level signaling (e.g., Pulse Amplitude Modulation (PAM)), and other constellations that allow the use of DFE for equalization.

Input data/signal with ISI is received at the pad. Termination impedance (e.g., 50 Ωs) is used to correct for reflections in the received input. In some embodiments, termination impedance is ground terminated. In some embodiments, the termination impedance is biased by a common mode voltage Vcm. Vcm can be generated by a voltage divider (e.g., a resistor divider) and a unity gain amplifier. The received input is then amplified by VGA 101 to generate signal $y_k$, where $y_k$ is a digital representation of the output of VGA 101. In some embodiments, VGA 101 is tuned either in closed loop or by a fixed predetermined value to select a signal level that is comfortable to process by upstream circuits. In some embodiments, the output of VGA 101 is a continuous time-domain signal which is then sampled by a slicer in Delay Resilient DFE 102. Delay Resilient DFE 102 cancels or reduces the ISI from $y_k$, according to various embodiments. The output $d_k$ of Delay Resilient DFE and data slicer(s) 102 is the ISI free signal (or signal with reduced ISI) which is then further processed.

In some embodiments, portion 100 is part of a high speed I/O. For example, portion 100 is part of Serializers/Deserializers (SERDES), Ethernet, Infiniband, Peripheral Component Interconnect (PCI) Express (PCIe) compliant interface, Serial Advance Technology Attachment (SATA) compliant interface, Serial Attached Small Computer System compliant interface (SAS), Universal Serial Bus (USB) compliant interface, Intel® Quick Path Interconnect (QPI), etc.

Figure 2:
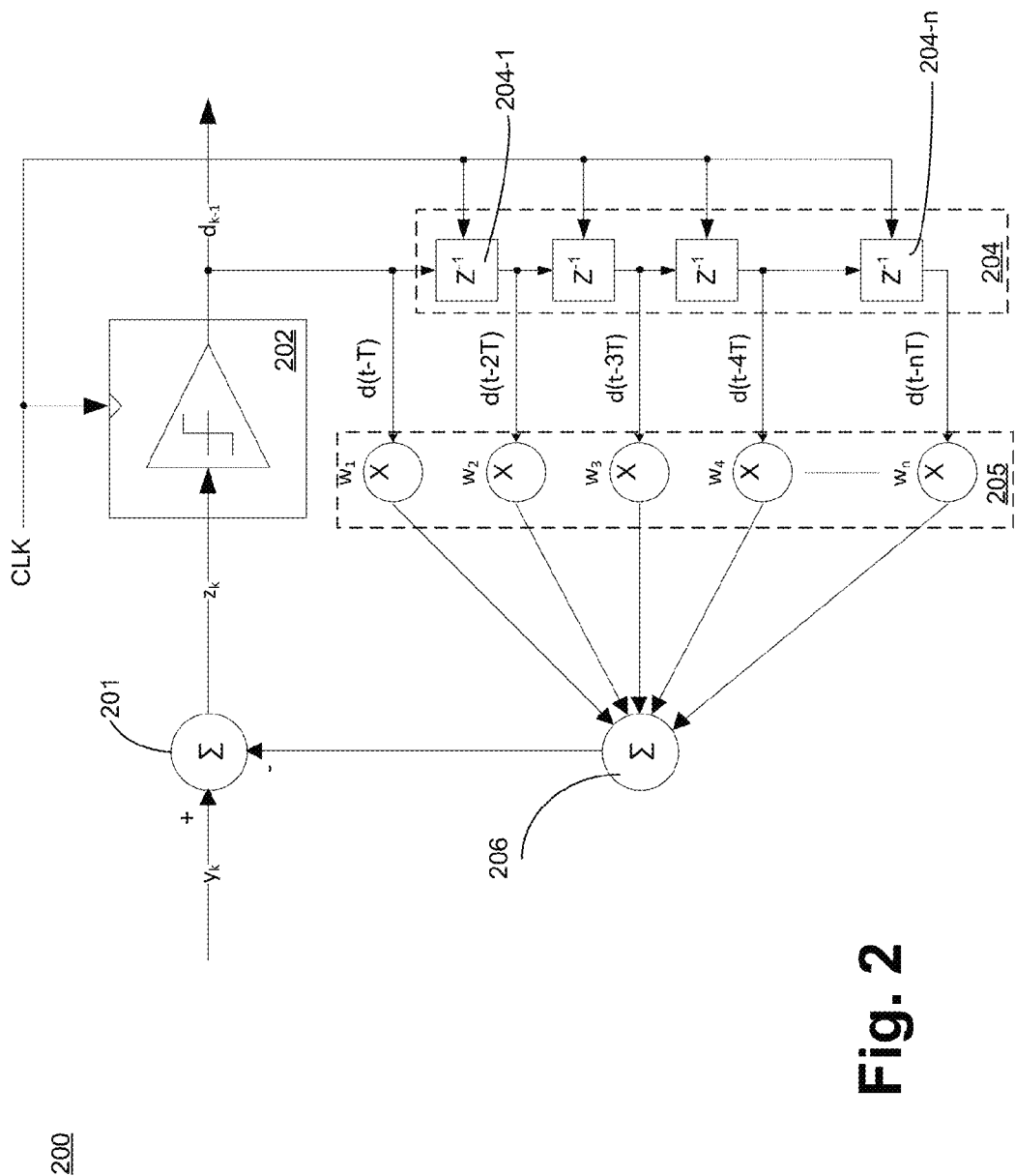
FIG. 2 illustrates a traditional DFE.

FIG. 2 illustrates a traditional DFE 200, according to some embodiments of the disclosure. Traditional DFE 200 includes summer (or subtractor) 201, slicer 202, delay units 204, digital-to-analog converters (DAC) 205 that add weight to digital signals to generate analog signals, and summer 206. Summer 201 receives input signal $y_k$ from VGA 101 and generates output $z_k$. Initially, $z_k$ is the same as $y_k$. $z_k$ is then received by slicer 202 that samples the input data and determines whether $z_k$ is logical one or logical zero. Here, the sampling clock (CLK) is also received by delay units 204-1 through 205-n, where 'n' is an integer.

In some embodiments, the weights (i.e., where 'n' is an integer) described with reference to DAC 205 are tuned either manually or automatically by various search methods, descent methods, heuristics or other control loops, with various tuning goals, depending on implementation (e.g., Zero-Forcing of the ISI, Maximization of S/N, MMSE achievement, etc.). Some DFEs of various embodiments may have a mixture of these methods.

Here, the first feedback loop ($w_1$) relates to the first tap of DFE 200 which cancels the first post-cursor. The first feedback loop is from $d_{k-1}$, DAC $w_1$, summer 206 to summer 201. Due to the inherent delay of slicer 202 (also referred to as the decision element) and DAC 205, which takes the decision value (e.g., d(t−T)) and converts it to current/voltage with the right weighting to the summation points (i.e., summers 201 and 206) right before slicer 202, no additional delay element is needed on this loop. Here, 'T' is the signalization interval and is also referred to as 1 UI (one unit interval) duration which is a time duration of a signal symbol at the rate of transmission used, Baud rate, etc. In some embodiments, the sampling in slicer 202 provides the 1 UI data delay needed for the functioning of the 1$^{st}$ tap (i.e., the first feedback loop). In such embodiments, no further delay is needed. The first feedback loop usually presents the critical timing path of DFE 200. This critical timing path can be resolved using a loop unrolling technique, for example.

The lower feedback loop(s) (i.e., those passing through DACs $w_2$ through $w_n$) contain(s) the other taps of DFE 200 and comprises a set of concatenated delay elements (e.g., Flip-Flops or latches, etc.) 204 for canceling the rest of the post-cursors up to the DFE depth (here, the depth is 'n'). In some embodiments, DFE designs using ½ rate (i.e., ½ rate DFE) use latches instead of Flip-Flops (FFs). While various embodiments are described with reference to delay elements implemented as FFs, a person skilled in the art would appreciate that other forms of delay elements may be used (e.g., latches, etc.)

Here, inputs to non-first DFE tap DACs are delayed by a UI delay from the FFs of 204. For example, input (or decision value) to DAC $w_2$ is d(t−2T); input to DAC $w_3$ is d(t−3T); input to DAC $w_4$ is d(t−4T); and input to DAC $w_n$ is d(t−nT). In some embodiments, this branch is not summed with the signal at the input of slicer 202 but rather at the input to the last VGA stage (i.e., last stage of VGA 101). This adds the last stage of VGA 101 to the timing budget and creates another critical timing path.

The timing path is described as follows. Let:
x(t)—input of the last VGA stage;
y(t)—output of the last VGA stage;
z(t)—input of the slicer; and
d(t)—output of the slicer.
The signal at slicer 202 may be expressed as:

$$z_k = y_k - \Sigma_{i=1}^{n} w_i \tilde{d}_{k-i} \tag{1}$$

or in the continuous time-domain, the signal at the input of slicer 202 may be expressed as:

$$z(t) = y(t) - \Sigma_{i=2}^{n} w_i \tilde{d}(t-(i-1)T-\tau_2-\tau_3) \tag{2}$$

The decision signal can be expressed as:

$$\tilde{d}(t) = \text{sign}(z(t-\tau_1)) \tag{3}$$

where $\tau_1$ and $\tau_2$ are the time-to-clock outputs (i.e., Tco) of slicer 202 and flip-flop 204 (i.e., for each one of delay unit 204-1 through 204-n, where 'n; is an integer), $\tau_3$ is the analog settling time of DAC 205 (i.e., each one of DAC 205-1 through 205-n), and T is the duration of one Unit Interval (UI).

For the lower feedback loop (neglecting the upper or first feedback branch), combining equations 1, 2, and 3 results in:

$$z(t) = y(t) - \Sigma_{i=2}^{n} w_i \cdot \text{sign}(z(t-(i-1)T-\tau_1-\tau_2-\tau_3)) \tag{4}$$

Hence, for a correct operation of DFE 200 the design operates with the following condition:

$$\tau_1 + \tau_2 + \tau_3 = \Sigma_i \tau_i \leq T \tag{5}$$

i.e., for correct operation of DFE tap 1, the design should meet the following stringent condition:

$$\tau_1 + \tau_3 \leq T \tag{5a}$$

For correct operation of other DFE taps (i.e., non-first DFE taps), the design should meet the following stringent condition $$\tau_2 + \tau_3 \leq T \tag{5b}$$

Meeting these conditions is challenging especially when considering process variations and different temperatures in which the device is designed to operate, and becomes more challenging as the number of DFE taps (coefficients) increase. If $\Sigma_i \tau_i$ is larger than T, the whole timing may be broken and the contribution of DFE 200 to the ISI cancellation is suppressed to a level at which DFE 200 may not be effective at all.

This timing condition is relaxed using a variable delay circuit, according to some embodiments.

Figure 3A:
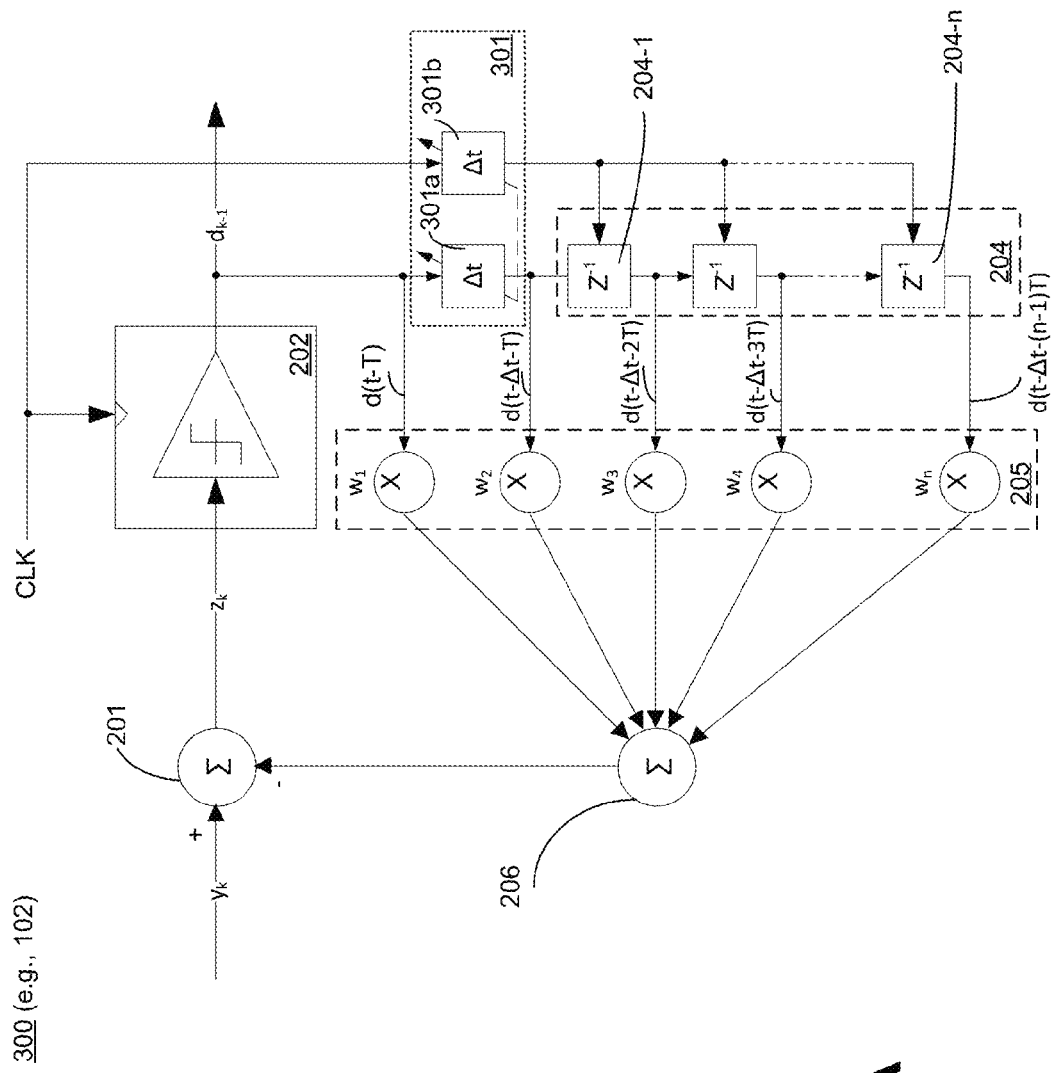
FIG. 3A illustrates a delay resilient DFE, according to some embodiments of the disclosure.

FIG. 3A illustrates delay resilient DFE 300 (e.g., DFE 102), according to some embodiments of the disclosure. It is pointed out that those elements of FIG. 3A having the same reference numbers (or names) as the elements of any other figure can operate or function in any manner similar to that described, but are not limited to such. FIG. 3A is described with reference to FIG. 2.

In some embodiments, delay resilient DFE 300 includes summer (or subtractor) 201, slicer 202, variable delay circuit(s) 301, delay units 204, DAC 205 that add weight to digital signals to generate analog signals, and summer 206. In some embodiments, summer 201 receives input signal $y_k$ from VGA 101 and generates output $z_k$. Initially, $z_k$ is same as $y_k$. In some embodiments, output $d_{k-1}$ of slicer 202 is received as input to variable delay circuit 301 such that output $d_{k-1}$ is delayed by Δt for the non-first DFE taps (i.e., first DFE tap which is generated by DAC output $w_1$ of DAC 205 which receives $d_{k-1}$ directly). The first DFE tap is also referred to here as the zero DFE tap.

In some embodiments, DFE 300 (as opposed to DFE 200) maps differently the former decisions (d(t)) to their corresponding weighting elements (i.e., DACs 205) by inclusion of variable delay Δt to clock and data paths. The variable delay Δt added to the data path is 301a. The variable delay Δt added to the clock path is 301b. The data path begins from $d_{k-1}$ and clock path begins from CLK. Here, labels for signals and nodes are interchangeably used. For example, CLK may refer to clock signal or node carrying the clock signal depending on the context of the sentence.

In some embodiments, output $d_{k-1}$ of slicer 202 is received as an input to variable delay circuit 301 such that output $d_{k-1}$ is delayed by Δt for the non-first tap DFEs (i.e., first DFE tap is generated by output $w_1$ of DAC 205 which receives $d_{k-1}$ directly). Because of inclusion of delay Δt 301, inputs to non-first DFE tap DACs are delayed by Δt. For example, input (or decision value) to DAC $w_2$ is d(t−Δt−T); input to DAC $w_3$ is d(t−Δt−2T); input to DAC $w_4$ is d(t−Δt−3T); and input to DAC $w_n$ is d(t−Δt−(n−1)T).

In some embodiments, the first feedback loop (i.e., loop from slicer 202 through DAC $w_1$ to summer 206, summer 201 and back to slicer 202) cancels a first post-cursor on $y_k$, while the second feedback loop (i.e., loop from slicer 202, through variable delay cell 301a, DAC $w_2$ to summer 206, summer 201 and back to slice 202) cancels a second post-cursor on $y_k$. Here, the second feedback loop includes the second DFE tap path (i.e., path through DAC $w_2$) also referred to here as the non-first DFE path (where the non-first DFE path is the path through DAC $w_1$).

In some embodiments, inclusion of variable delay Δt to clock and data paths by variable delay circuits 301a and 301b, respectively, relaxes the timing conditions as described below. With the variable delay Δt, each added to clock and data paths, in some embodiments, the output $z_k$ of summer 201 in time-domain can be expressed as:

$$z(t)=y(t)-\Sigma_{i=2}^n w_i \cdot \text{sign}(z(t-(i-2)T-\tau_1-\tau_2-\tau_3-\Delta t)) \quad (6)$$

Note, the index change on the flip-flop delays (e.g., 204-1 to 204-n) from i−1 to i−2 compared to DFE 200 due to the routing change, which adds a whole UI to the timing budget. In some embodiments, DEF tap2 connects to the output of the decision circuit with the analog/variable controlled delay (delta_t (Δt)). This delay may be tuned so that the overall delay of DEF tap2 now causes its signal to settle at the input of the slicer in time for the next decision. For correct DFE operation, the equivalent timing requirement is now given by:

$$\tau_1+\tau_2+\tau_3+\Delta=\Sigma_i \tau_i+\Delta t \leq 2T \quad (7)$$

In some embodiments, DFE 300 can operate properly even if the inherent circuit delays, $\Sigma_i \tau_i$, is greater than one UI duration. The range of delays that Δt may support is given by:

$$2T-\max(\Sigma_i \tau_i) \leq \Delta t \leq 2T-\min(\Sigma_i \tau_i) \quad (8)$$

or $$0.5T \leq \Delta t \leq 1.5T \text{ or greater if there are no timing issues} \quad (8a)$$

In some embodiments, the clock going into the Flip-Flops (FF's) 204 (or latches, denoted by $Z^{-1}$ delay elements) may also be delayed by the same Δt, so proper latching of the right decision with ample setup/hold times is guaranteed. In some embodiments, the matching between the decisions' delay and the clocks' delay may not be tight (i.e., there may be slight differences between delay Δt 301a and delay Δt 301b). In some embodiments, delay Δt 301a and delay Δt 301b are substantially equal.

Figure 6A:
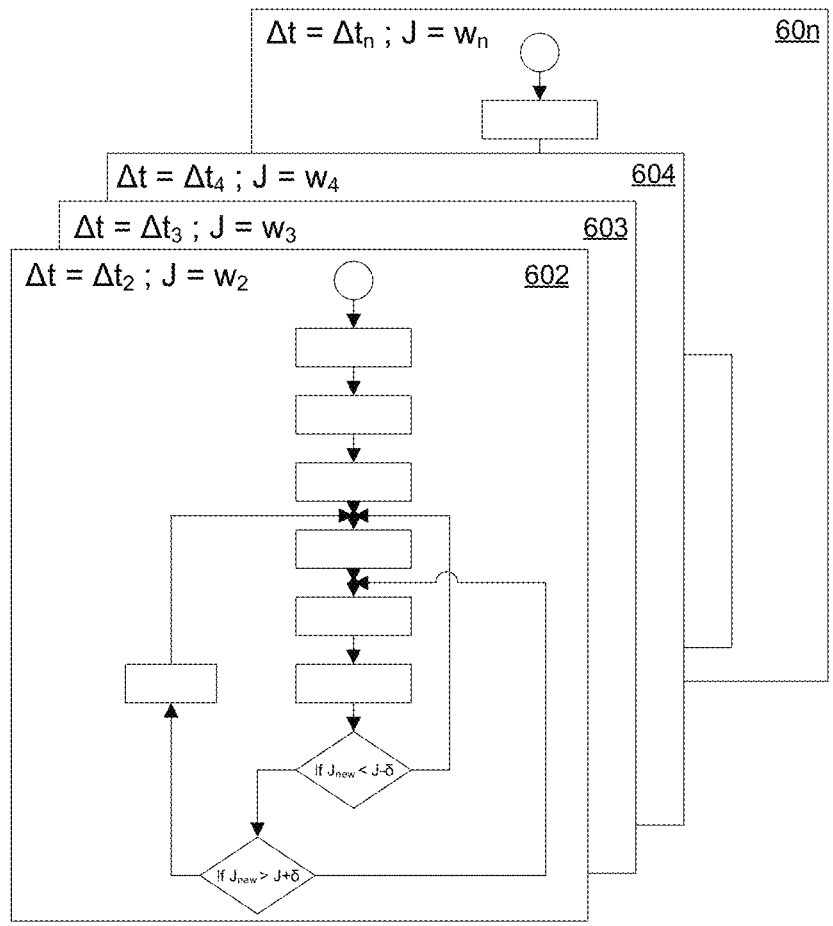
FIG. 6A illustrates parallel or sequential operation of tuning delays (i.e., delay adaptations), according to some embodiments.
Figure 6B:
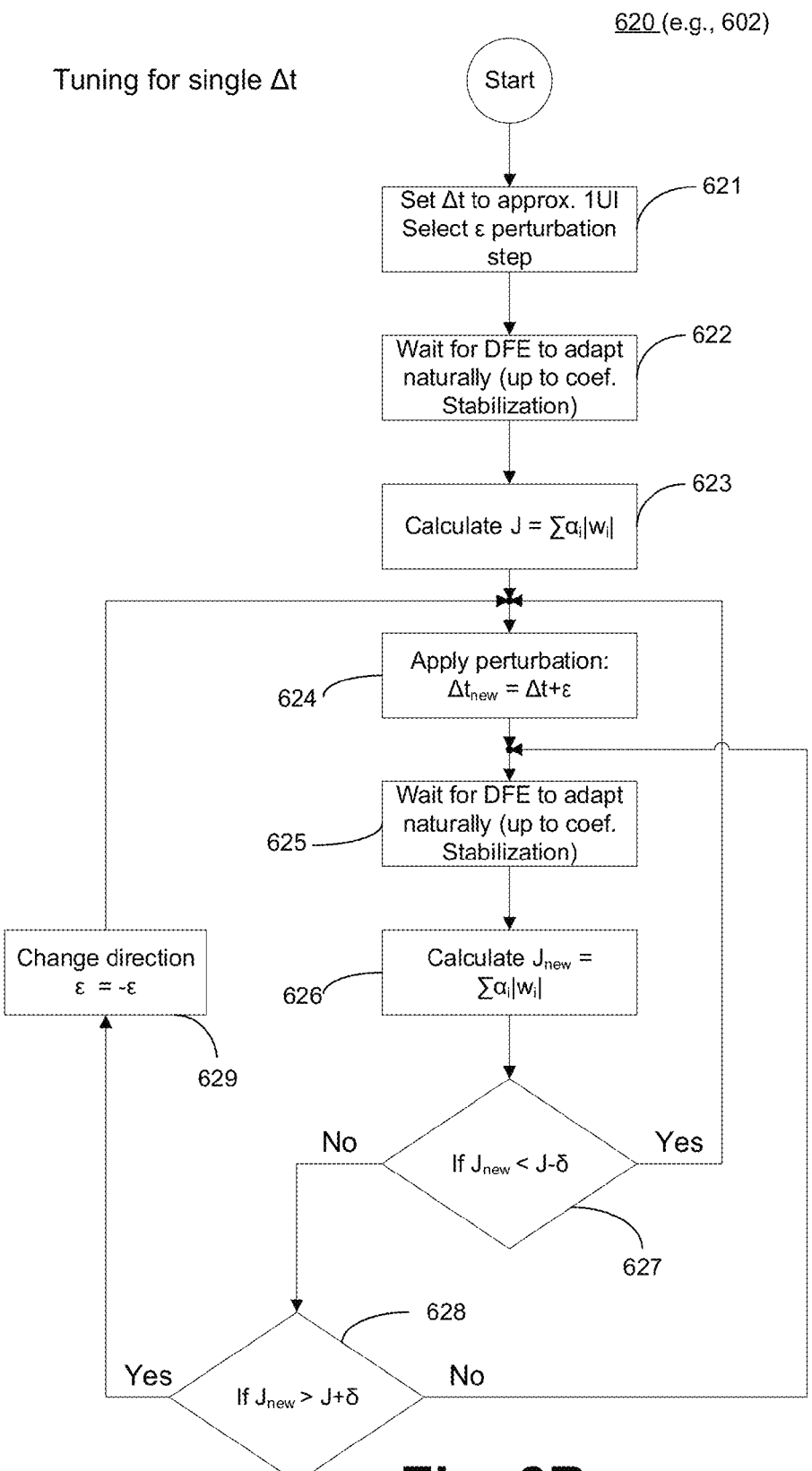
FIG. 6B illustrates flowchart for tuning a tunable delay ($\Delta t$), according to some embodiments of the disclosure.

In some embodiments, the delay of variable delay circuits 203a/b in DFE 300 are tuned (i.e., delay is adjusted) until the sum of absolute DFE coefficients is minimized (e.g., reduced), giving a reasonable compromise for proper settling across all DFE taps. In some embodiments, the delay of variable delay circuits 203a/b are tuned by a Finite State Machine (FSM), a digital signal processing method, etc. FIGS. 6A-B describe a method of tuning the delay circuits according to some embodiments.

Referring back to FIG. 3A, in some embodiments, delays 301 are added before the digital delay line 204 (i.e., flops, latches). In some embodiments, delays 301 are added after the digital delay line 204 and before each TAP DAC/weight 205. In some embodiments, when delays 301 are placed before the digital delay line 204 then the data and clock delays (i.e., 301a and 301b) are tuned in unison (or with some relation between them). In some embodiments, when delays 301 are added after the digital delay lines 204, each delay element tuning may be tuned separately or by obeying a control rule/policy optimizing the ensemble.

Figure 3B:
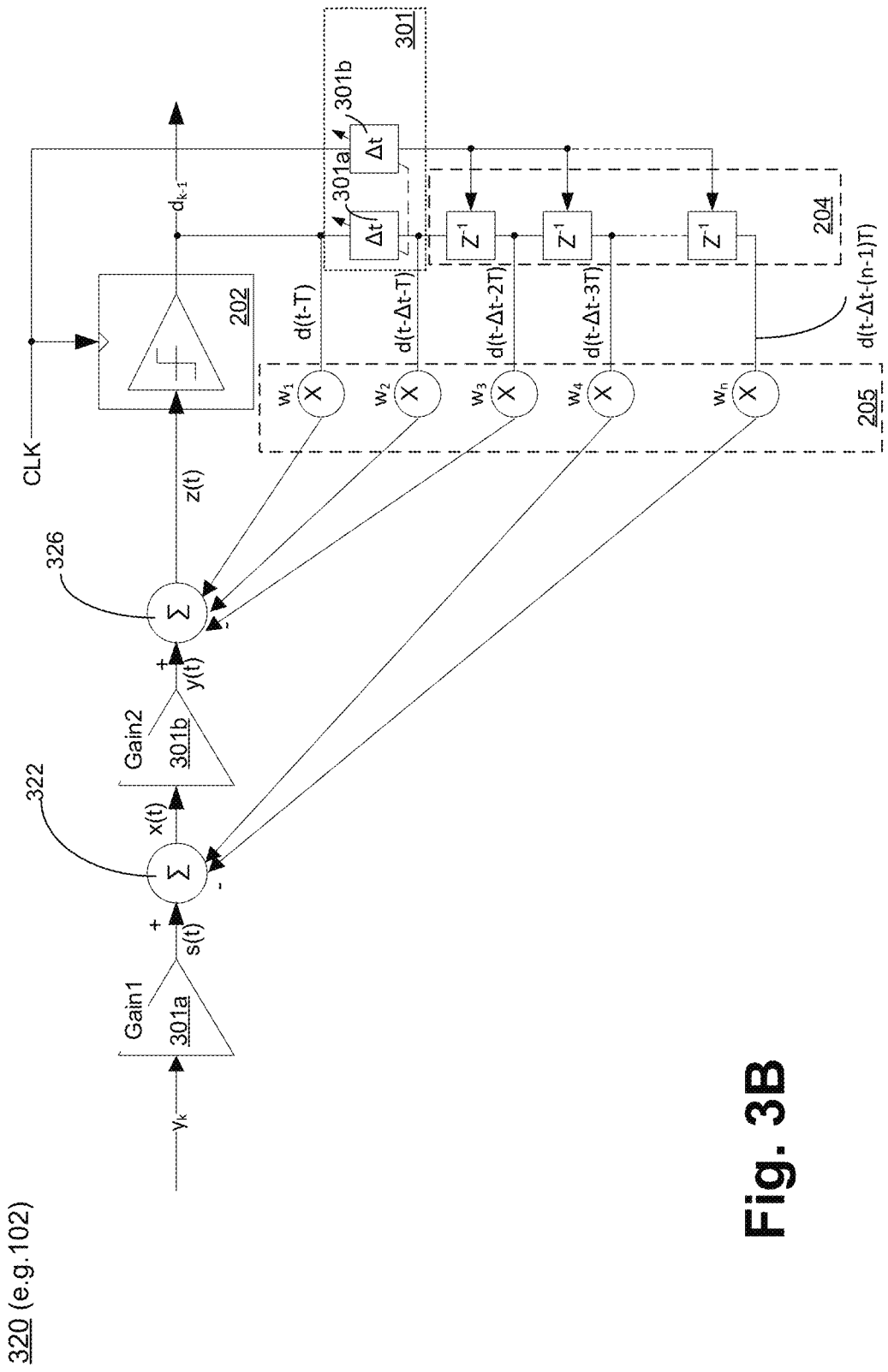
FIG. 3B illustrates a delay resilient DFE, according to some embodiments of the disclosure.

FIG. 3B illustrates delay resilient DFE 320, according to some embodiments of the disclosure. It is pointed out that those elements of FIG. 3B having the same reference numbers (or names) as the elements of any other figure can operate or function in any manner similar to that described, but are not limited to such. FIG. 3B is described with reference to FIG. 3A. So as not to obscure the embodiments, differences between FIG. 3A and FIG. 3B are described.

In some embodiments, DFE 320 includes multiple gain stages 301a and 301b; and multiple summers 322 and 326 coupled together as shown. While the embodiment of DFE 320 shows two gain stages and two summers, more than two may be used. In some embodiments, ISI is subtracted in parts instead once by summer 201. In some embodiments, three DFE taps are subtracted by summer 326 from the output of the last gain stage, Gain2 310b, and the rest of the DFE taps are subtracted from the output of gain stage Gain1 310a. In other embodiments, any number of taps can be subtracted by summer 326 from the output of the last gain stage. Continuing with the example of subtracting three DFE taps, the input to slicer 202 can be expressed as:

$$z(t)=s(t-\tau_4)-\Sigma_{i=2}^n w_i \cdot \text{sign}(z(t-(i-2)T-\tau_1-\tau_2-\tau_3-\tau_4-\Delta T)) \quad (9)$$

where $\tau_4$ is the delay of gain stage Gain2 301b. One technical effect of this embodiment is that it eases the design of the gain circuit 301b since more ISI is subtracted before Gain2 stage 301b.

For correct operation of DFE 320, the equivalent timing requirement is expressed by:

$$\tau_1+\tau_2+\tau_3+\tau_4+\Delta t=\Sigma_i\tau_i+\Delta t\leq 2T \quad (10)$$

In some embodiments, DFE 320 can operate properly even when the inherent circuit delays, $\Sigma_i\tau_i$, are greater than one UI duration. In some embodiments, for DFE 320, the range of delays that variable delay circuit 203a/b (i.e., $\Delta t$) should support can be expressed as:

$$2T-\max(\Sigma_i\tau_i)\leq\Delta t\leq 2T-\min(\Sigma_i\tau_i) \quad (11)$$

i.e., for correct operation of DFE tap 1, the design should meet the following condition:

$$\tau_1+\tau_3\leq T \quad (11a)$$

For correct operation of other DFE taps (i.e., non-first taps), the design should meet the following condition $$\tau_2+\tau_3+\Delta t\leq 2T \quad (11b)$$

While the embodiment of FIG. 3B illustrate the first three taps being subtracted by summer 326 and the rest of the taps being subtracted by summer 322, other tap summation arrangements are possible. For example, fewer or more than three taps can be subtracted by summer 326.

In some embodiments, the delay of variable delay circuits 203a/b in DFE 320 are tuned (i.e., delay is adjusted) until the sum of absolute DFE coefficients is minimized, giving a reasonable compromise for proper slewing across all DFE taps. FIGS. 6A-B describe a method of tuning the delay circuits according to some embodiments.

Referring back to FIG. 3B, in some embodiments, DFE 300/320 uses Least Mean Square (LMS), or one of its' variants, as the DFE adaptation scheme (i.e., for adaptively adjusting the DFE tap-coefficient vector to track the dynamics of fading channels in order to reduce the squared equalization error). In some embodiments, DFE 300/320 uses Recursive Least Squares (RLS) as the DFE adaptation scheme. In some embodiments, DFE 300/320 tunes the introduced delay $\Delta t$ slowly (i.e., slower than the DFE adaptation scheme) until the DFE tap's coefficient reaches a minimal value for the minimal delay this value is reached. The correct delay will allow the DFE tap to stabilize at the peak of its response and complete its skewing right at the sampling time of slicer 202.

In some embodiments, delays 301 are added before the digital delay line 204 (i.e., flops, latches, etc.). In some embodiments, delays 301 are added after the digital delay line 204 and before each tap DAC/weight 205. In some embodiments, when delays 301 are placed before the digital delay line 204, the data and clock delays (i.e., 301a and 301b) are tuned in unison (or with some relation between them). In some embodiments, when delays 301 are added after the digital delay lines 204, each delay element tuning may be tuned separately or by obeying a control law optimizing the ensemble.

Figure 4:
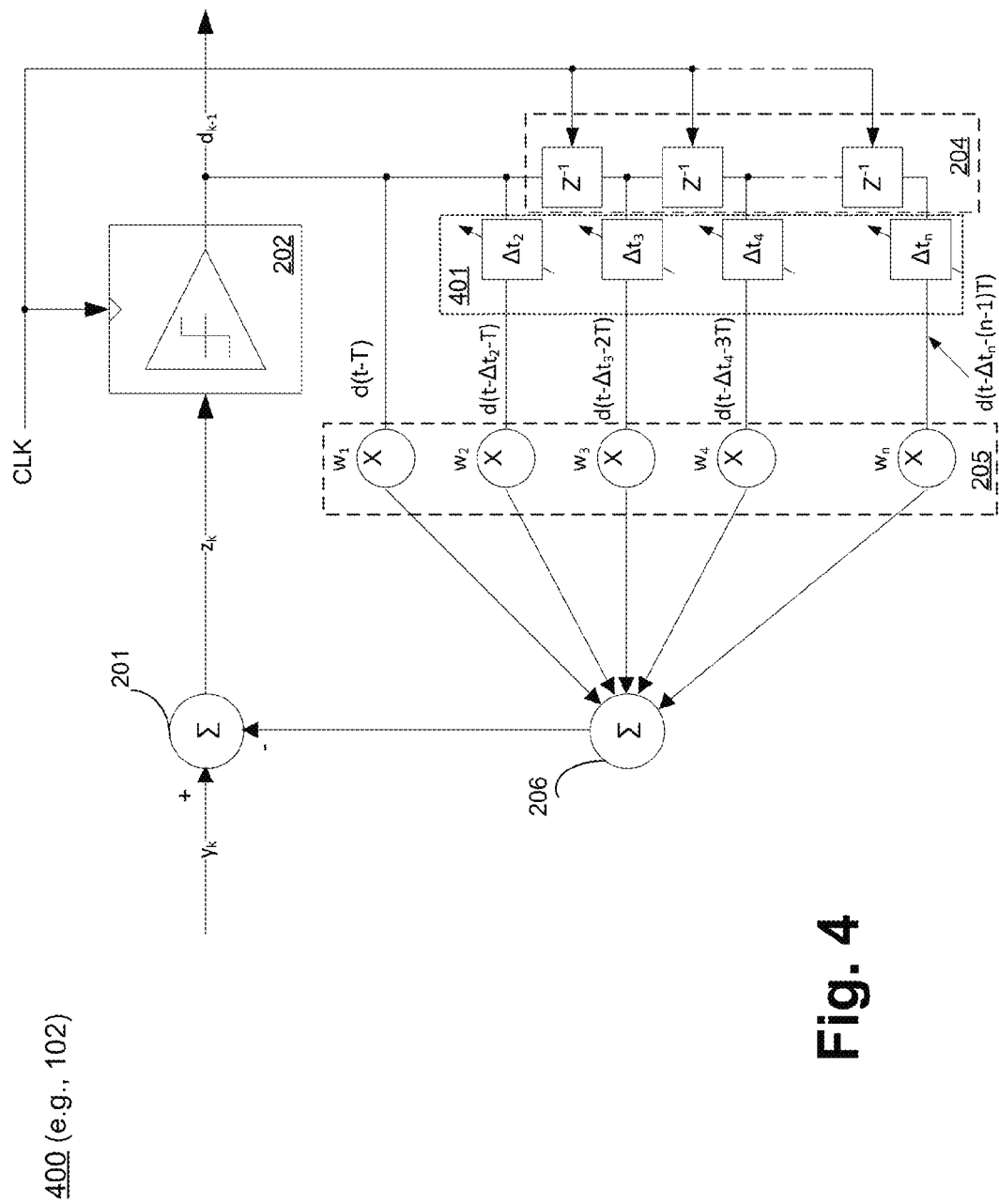
FIG. 4 illustrates a delay resilient DFE, according to some embodiments of the disclosure.

FIG. 4 illustrates delay resilient DFE 400, according to some embodiments of the disclosure. It is pointed out that those elements of FIG. 4 having the same reference numbers (or names) as the elements of any other figure can operate or function in any manner similar to that described, but are not limited to such. FIG. 4 is described with reference to FIG. 3A. So as not to obscure the embodiments of FIG. 4, differences between FIG. 3A and FIG. 4 are described.

In some embodiments, DFE 400 comprises a plurality of variable delay circuits 401 instead of two variable delay circuits 301a/b in FIG. 3A. In some embodiments, variable delay circuits (or elements) 401 are placed after the digital delay ($Z^{-1}$) cells 204 as shown. In this embodiment, a delay cell ($Z^{-1}$) is now used per each DFE tap.

Because of inclusion of delay 401, inputs to non-first DFE tap DACs are delayed by respective delays. For example, input (or decision value) to DAC $w_2$ is $d(t-\Delta t_1-T)$; input to DAC $w_3$ is $d(t-\Delta t_2-2T)$; input to DAC $w_4$ is $d(t-\Delta t_3-3T)$; and input to DAC $w_n$ is $d(t-\Delta t_n-(n-1)T)$. In some embodiments, delays $\Delta t_1$, $\Delta t_2$, $\Delta t_3$, through $\Delta t_n$ are substantially equal delays. In some embodiments, delays $\Delta t_1$, $\Delta t_2$, $\Delta t_3$, through $\Delta t_n$ are different delays. In some embodiments, each of delays $\Delta t_1$, $\Delta t_2$, $\Delta t_3$, through $\Delta t_n$ are controlled by different delay control signals (shown by diagonal arrows through delays 301a/b). In some embodiments, each of delays $\Delta t_1$, $\Delta t_2$, $\Delta t_3$, through $\Delta t_n$ are controlled by the same control signals.

In some embodiments, having several delays (i.e., $\Delta t_1$, $\Delta t_2$, $\Delta t_3$), instead of one, is to allow them to adapt independently. In such embodiments, the paths of the DFE feeding back to the summing node need may not be identical. In some embodiments, any difference in delay due to different routing or loading conditions is individually cancelled by proper tuning of the delay elements in each tap path.

Some technical effects of FIG. 4 are that its design may be more flexible than the DFE designs of FIGS. 3A-B. For example, the design of DFE 400 allows for a more holistic optimization and further eases the DFE routing. In some embodiments, having many tuning points, each for each DFE tap, allows for tuning the DFE taps individually to maximize the settling of each tap individually. In such cases, tuning the taps using a single setting is avoided, where single setting settles a combination but each DFE tap may be less than optimal. Another technical effect of FIG. 4 is obtained by eliminating the need to match the delay on the feedback paths from different taps. As such, it may make the circuit a lot easier to implement and also may enable previously very difficult to realize quad-rate DFE implementations. In some embodiments, the half rate DFE scheme can be combined with the embodiment of FIG. 4. In some embodiments, the quarter rate DFE scheme can be combined with the embodiment of FIG. 4.

In some embodiments, DFE 400 uses LMS as the DFE adaptation scheme. In some embodiments, DFE 400 uses RLS as the DFE adaptation scheme. In some embodiments, DFE 400 tunes the introduced delay $\Delta t$ (i.e., $\Delta t_1$, $\Delta t_2$, $\Delta t_3$, through $\Delta t_n$) slowly (i.e., slower than the DFE adaptation scheme) until the coefficient of the DFE tap reaches a minimal value for the minimal delay added (i.e., each coefficient is individually selected or a subset of coefficients is selected). The delay of $\Delta t$ (i.e., $\Delta t_1$, $\Delta t_2$, $\Delta t_3$, through $\Delta t_n$) after tuning will allow the DFE tap to stabilize at the peak of its response. As such, DFE 400 completes its skewing at the sampling time of slicer 202.

Figure 5:
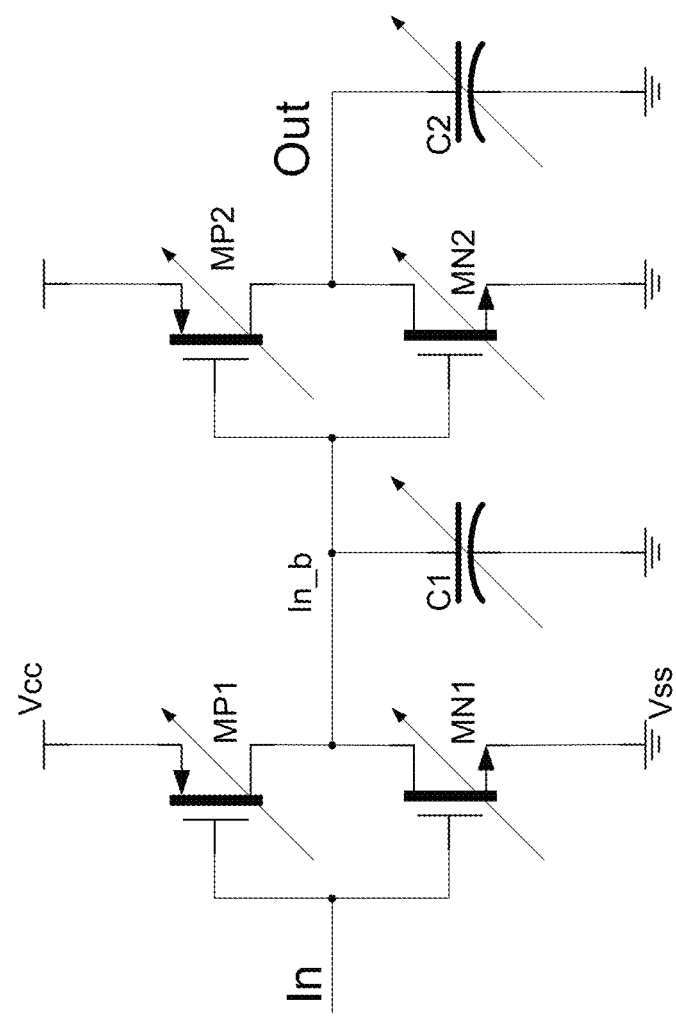
FIG. 5 illustrates a variable delay circuit for use in a delay resilient DFE, according to some embodiments of the disclosure.

FIG. 5 illustrates variable delay circuit 500 (e.g., 301a/b and/or one of delay circuits in 401) for use in a delay resilient DFE, according to some embodiments of the disclosure. It is pointed out that those elements of FIG. 4 having the same reference numbers (or names) as the elements of any other figure can operate or function in any manner similar to that described, but are not limited to such.

In some embodiments, variable delay circuit 500 comprises a first delay stage having transistors MP1 and MN1, and a second delay stage having transistors MP2 and MN1 coupled together as shown. In some embodiments, the driving strength of transistors MP1, MN1, MP2, and MN2 can be adjusted by turning on/off more transistors. For example, strength of transistor MP1 can be increased by turning on more transistors (also labeled as transistor MP1)

in parallel to transistor MP1. In some embodiments, drain terminals of transistors MP1 and MN1 are coupled to In_b. In some embodiments, a variable capacitance device C1 is coupled to node In_b. By changing the capacitance of the variable capacitance device C1, propagation delay from In to In_b changes. In some embodiments, drain terminals of transistors MP2 and MN2 are coupled to Out. In some embodiments, a variable capacitance device C2 is coupled to node Out. By changing the capacitance of the variable capacitance device C2, propagation delay from In_b to Out changes.

Variable delay circuit 301a/b and/or one of delay circuits in 401 may be implemented with other designs such as current starved inverters, inverters with gated capacitive load fingers, analog continuous delay elements, or any other controlled delay block which can handle the interface signaling rates (or ½, ¼, etc. rates for some implementations). In some embodiments, any digital-input and digital-output controlled delay cell can be used to implement variable delay circuit 301a/b and/or one of delay circuits in 401. In some embodiments, the controlled delay range of variable delay circuit 301/401 is between 0.5T and 1.5T, where T is the UI or bit interval time.

In some embodiments, a variable delay circuit can be used for sub UI tuning by analog mechanisms (e.g., by a controlled voltage/current bias that changes the delay element's propagation delay). In some embodiments, a variable delay circuit can be used for sub UI tuning by digital mechanisms (e.g., by controlling the number of active transistor slicers in a DFE topology). In some embodiments, an inverter may be used as a delay element which is controlled by tuning the strength of each transistor, or by tuning the magnitude/multiplication-factor of the load capacitance.

FIG. 6A illustrates parallel or sequential operation 600 of tuning delays (i.e., delay adaptations), according to some embodiments. Here, each Δt (of 301) is tuned either parallel for each DFE tap 602, 603, 604, . . . 60n (where 'n' is an integer greater than 4) or sequentially, according to some embodiments. In some embodiments, each DFE tap has a unique tunable delay (Δt). In some embodiments, each delay (Δt) adapts to minimize its own tap coefficient. The flowchart in each DFE tap is described with reference to FIG. 6B.

FIG. 6B illustrate flowchart 620 for tuning a tunable delay (Δt), according to some embodiments of the disclosure. It is pointed out that those elements of FIG. 6B having the same reference numbers (or names) as the elements of any other figure can operate or function in any manner similar to that described, but are not limited to such.

Although the blocks in the flowchart with reference to FIG. 6B are shown in a particular order, the order of the actions can be modified. Thus, the illustrated embodiments can be performed in a different order, and some actions/blocks may be performed in parallel. Some of the blocks and/or operations listed in FIG. 6B are optional in accordance with certain embodiments. The numbering of the blocks presented is for the sake of clarity and is not intended to prescribe an order of operations in which the various blocks must occur. Additionally, operations from the various flows may be utilized in a variety of combinations.

In some embodiments, flowchart 620 is executed or performed by a finite state machine (FSM). At block 621, a FSM (not shown) sets the tunable delay Δt (301) to approximately 1 UI. In some embodiments, the FSM then selects the perturbation step c, where c may be an arbitrary or an experiment based perturbation step (which is generally very small). At block 622, the FSM waits for the DFE to adapt to the set tunable delay Δt. The wait time may be programmable. The wait time may depend on the coefficient stability.

At block 623, the FSM calculates the cost function J, where J=($\Sigma$ $\alpha_i|w_i|$). The cost function J can be any type of cost function. For example, the cost function J can be a signal to noise ratio (SNR), Means Square Error (MSE) as a noise floor, Bit Error Rate (BER), a cost function that optimizes the settling of the DFE, etc. For purposes of explaining FIG. 6B, the cost function J is a function that is optimized by tuning the settling of the DFE. At block 624, the FSM applies the new perturbation $\Delta t_{new}$, to the delay unit, where $\Delta t_{new}$, is Δt+ϵ. At block 625, the FSM causes the DFE to wait to adapt the new delay. The wait time may be programmable. The wait time may depend on coefficient stability.

At block 626, a new J (i.e., $J_{new}$) is calculated, where, for example, $J_{new}$=($\Sigma$ $\alpha_i|w_i|$). At block 627, a determination is made by the FSM whether the $J_{new}$ is less than (J−δ), where δ (i.e., delta) is a dead-band window. In order to prevent fast oscillations around the threshold J, δ is added or subtracted so that in the interval J−δ through J+δ the system is indifferent. If the $J_{new}$ is less than (J−δ), the process proceeds to block 624 or else the process proceeds to block 628. At block 628, a determination is made by the FSM whether the $J_{new}$ is greater than (J+δ). If the $J_{new}$ is not greater than (J+δ), then the process proceeds to block 625 or else the process proceeds to block 629.

At block 629, the FSM changes the direction of the perturbation step ϵ. The purpose of changing the direction is to adapt to the other side. For example, if in the descent/search, a point is reached that further advancement in the same direction for the perturbation step does not reduce J anymore, the direction of the perturbation step is changed. In some embodiments, instead of changing the direction of the perturbation step or in combination of changing the direction of the perturbation step, the perturbation step size may be reduced and DFE adaptation is attempted again. Upon reaching the solution, the DFE adaptation may begin to slowly oscillate around this point. The process then proceeds to block 624.

Figure 7:
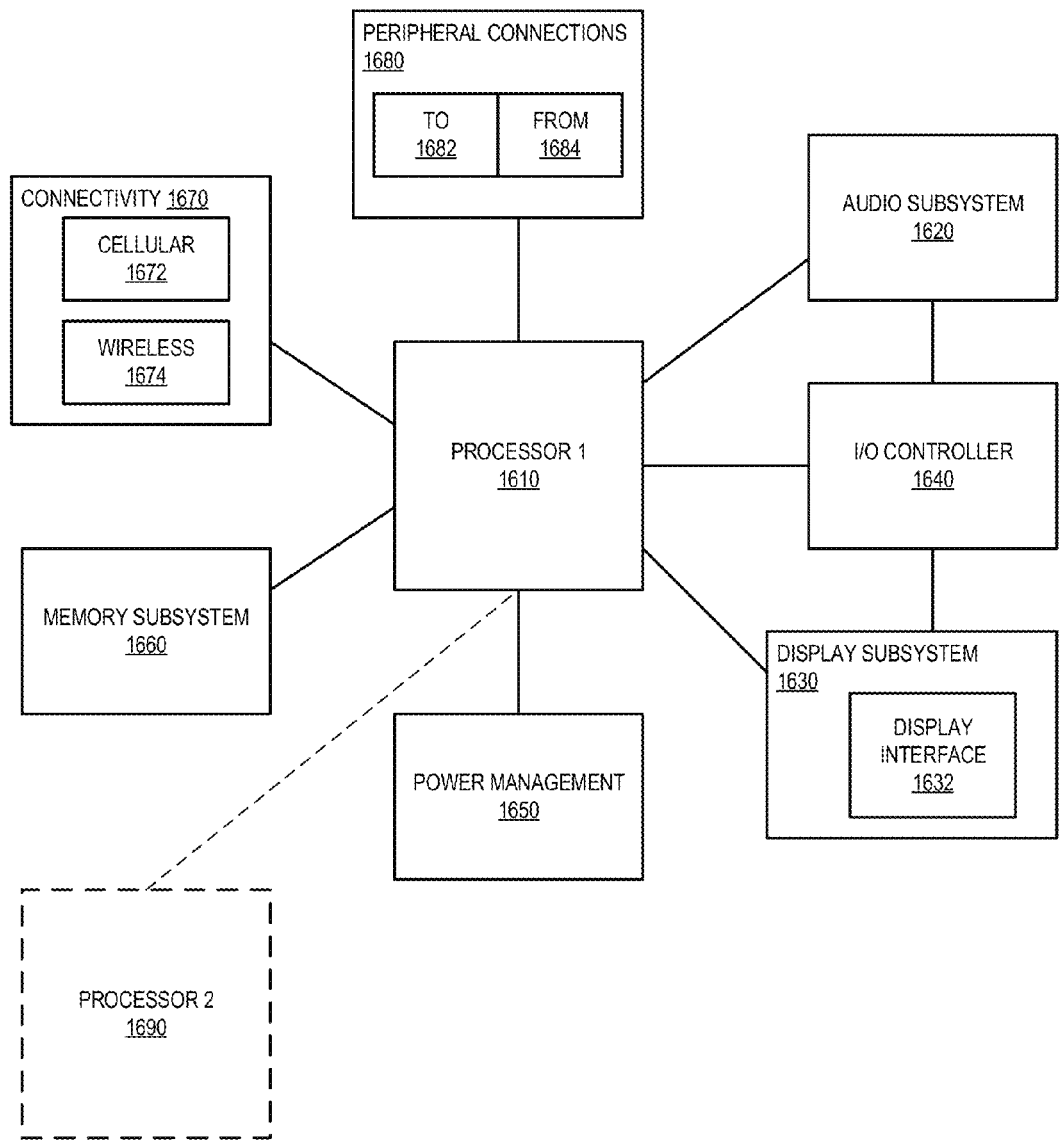
FIG. 7 illustrates a smart device or a computer system or a SoC (System-on-Chip) with a delay resilient DFE, according to some embodiments.

FIG. 7 illustrates a smart device or a computer system or a SoC (System-on-Chip) with delay resilient DFE, according to some embodiments. It is pointed out that those elements of FIG. 7 having the same reference numbers (or names) as the elements of any other figure can operate or function in any manner similar to that described, but are not limited to such.

FIG. 7 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. In some embodiments, computing device 1600 is a server, micro-server, storage server or a communication server. In some embodiments, computing device 1600 is a Network Interface Controller (NIC) device or switch device. It will be understood that certain components are shown generally, and not all components of such a device are shown in computing device 1600.

In some embodiments, computing device 1600 includes a first processor 1610 with the delay resilient DFE, according to some embodiments discussed. Other blocks of the computing device 1600 may also include the delay resilient DFE of some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 includes Connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 includes peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, Ethernet, Infiniband, PCIe, SATA, SAS, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a summer; a slicer to receive input from the summer; a first feedback loop to cancel a first post-cursor, the first feedback loop forming a loop by coupling the slicer to the summer; and a second feedback loop to cancel a second post-cursor, the second feedback loop forming a loop by coupling an input of the first feedback loop to the summer, wherein the second feedback loop having a programmable delay at its input.

In some embodiments, the second feedback loop to receive an output of the slicer and a clock signal, and wherein the programmable delay includes a first programmable delay to delay the output of the slicer and a second programmable delay to delay the clock signal. In some embodiments, the first and second programmable delays are positioned such that feedback loops subsequent to the first feedback loop receive the delayed output of the slicer and the delayed clock signal.

In some embodiments, the first and second programmable delays have a delay greater than or equal to half of a UI. In some embodiments, the first and second programmable delays have a delay less than or equal to one and a half of a UI. In some embodiments, the first and second programmable delays have substantially equal delays.

In some embodiments, the first programmable delay is different than the second programmable delay. In some embodiments, the summer comprises: a first summer; and a second summer, wherein the first and second summers are coupled to a gain stage. In some embodiments, the first and second feedback loops form respective loops by coupling to the first summer. In some embodiments, feedback loops subsequent to the first and second feedback loops, wherein at least one of the subsequent feedback loop is formed by coupling to the second summer. In some embodiments, the programmable delay provides output to a digital delay cell. In some embodiments, the programmable delay receives an output of a digital delay cell, wherein the digital delay cell to delay output of the slicer.

In another example, a system is provided which comprises: a memory; a processor coupled to the memory, the processor having a receiver according to the apparatus described above; and a wireless interface for allowing the processor to couple to another device.

In another example, an apparatus is provided which comprises: a DFE having a first DFE tap path and non-first DFE tap paths, wherein the DFE includes a variable delay circuit in a signal path of the non-first DFE tap paths. In some embodiments, the variable delay circuit receives an output of a digital delay cell of the DFE. In some embodiments, the variable delay circuit provides output to a digital delay cell of the DFE. In some embodiments, the variable delay circuit has a delay less than or equal to one and a half of a UI. In some embodiments, the variable delay circuit has a delay greater than or equal to half of a UI.

In another example, a system is provided which comprises: a memory; a processor coupled to the memory, the processor having a receiver according to the apparatus described above; and a wireless interface for allowing the processor to couple to another device.

In another example, a method is provided which comprises: cancelling, by a first feedback loop, a first post-cursor, the first feedback loop forming a loop by coupling a slicer to a summer; and cancelling, by a second feedback loop, a second post-cursor, the second feedback loop forming a loop by coupling an input of the first feedback loop to the summer, wherein the second feedback loop having a programmable delay at its input. In some embodiments, the method comprises: receiving, by the second feedback loop, an output of the slicer and a clock signal; delaying, by a first programmable delay of the programmable delay, the output of the slicer; and delaying, by a second programmable delay of the programmable delay, the clock signal.

In some embodiments, the first and second programmable delays are positioned such that feedback loops subsequent to the first feedback loop receive the delayed output of the slicer and the delayed clock signal. In some embodiments, the first and second programmable delays have a delay greater than or equal to half of a UI. In some embodiments, the first and second programmable delays have a delay less than or equal to one and a half of a UI.

In some embodiments, the first and second programmable delays have substantially equal delays. In some embodiments, the first programmable delay is different than the second programmable delay. In some embodiments, the method comprises providing an output to a digital delay cell which is coupled to the programmable delay.

In another example, an apparatus is provided which comprises: means for cancelling, by a first feedback loop, a first post-cursor, the first feedback loop forming a loop by coupling a slicer to a summer; and means for cancelling, by a second feedback loop, a second post-cursor, the second feedback loop forming a loop by coupling an input of the first feedback loop to the summer, wherein the second feedback loop having a programmable delay at its input.

In some embodiments, the apparatus comprises: means for receiving, by the second feedback loop, an output of the slicer and a clock signal, means for delaying, by a first programmable delay of the programmable delay, the output of the slicer; and means for delaying, by a second programmable delay of the programmable delay, the clock signal. In some embodiments, the first and second programmable delays are positioned such that feedback loops subsequent to the first feedback loop receive the delayed output of the slicer and the delayed clock signal. In some embodiments, the first and second programmable delays have a delay greater than or equal to half of a UI. In some embodiments, the first and second programmable delays have a delay less than or equal to one and a half of a UI.

In some embodiments, the first and second programmable delays have substantially equal delays. In some embodiments, the first programmable delay is different than the second programmable delay. In some embodiments, the method providing an output to a digital delay cell which is coupled to the programmable delay.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. An apparatus comprising:
   a summer;
   a slicer to receive input from the summer;
   a first feedback loop to cancel a first post-cursor, the first feedback loop forming a loop by coupling the slicer to the summer; and
   a second feedback loop to cancel a second post-cursor, the second feedback loop forming a loop by coupling an input of the first feedback loop to the summer, wherein the second feedback loop having a programmable delay at its input,
   wherein the second feedback loop is to receive an output of the slicer and a clock signal, and
   wherein the programmable delay includes:
      a first programmable delay to delay the output of the slicer; and
      a second programmable delay to delay the clock signal.
2. The apparatus of claim 1, wherein the first and second programmable delays are positioned such that feedback loops subsequent to the first feedback loop receive the delayed output of the slicer and the delayed clock signal.
3. The apparatus of claim 1, wherein the first and second programmable delays have a delay greater than or equal to half of a Unit Interval (UI).
4. The apparatus of claim 1, wherein the first and second programmable delays have a delay less than or equal to one and a half of a Unit Interval (UI).
5. The apparatus of claim 1, wherein the first and second programmable delays have substantially equal delays.
6. The apparatus of claim 1, wherein the first programmable delay is different than the second programmable delay.
7. The apparatus of claim 1, wherein the summer comprises:
   a first summer; and
   a second summer, wherein the first and second summers are coupled to a gain stage.
8. The apparatus of claim 7, wherein the first and second feedback loops form respective loops by coupling to the first summer.
9. The apparatus of claim 8 comprises feedback loops subsequent to the first and second feedback loops, wherein at least one of the subsequent feedback loop is formed by coupling to the second summer.
10. The apparatus of claim 1, wherein the programmable delay provides output to a digital delay cell.
11. The apparatus of claim 1, wherein the programmable delay receives an output of a digital delay cell, and wherein the digital delay cell to delay an output of the slicer.
12. An apparatus comprising:
   a decision feedback equalizer (DFE) comprising:
      a first DFE tap path originating from an output of a slicer and passing through a summer and ending at an input of the slicer, wherein the first DFE tap path is independent of any variable delay circuit between the input of the slicer and the output of the slicer; and
      non-first DFE tap paths, at least one of which originates from the output of the slicer and includes the summer, wherein the non-first DFE tap paths include a variable delay circuit between the output of the slicer and the summer.
13. The apparatus of claim 12, wherein the variable delay circuit receives an output of a digital delay cell of the DFE.
14. The apparatus of claim 12, wherein the variable delay circuit provides output to a digital delay cell of the DFE.
15. The apparatus of claim 12, wherein the variable delay circuit has a delay less than or equal to one and a half of a Unit Interval (UI).
16. The apparatus of claim 12, wherein the variable delay circuit has a delay greater than or equal to half of a Unit Interval (UI).
17. A system comprising:
   a memory;

a processor coupled to the memory, the processor having a receiver which comprises:
    a summer;
    a slicer to receive input from the summer;
    a first feedback loop to cancel a first post-cursor, the first feedback loop forming a loop by coupling the slicer to the summer; and
    a second feedback loop to cancel a second post-cursor, the second feedback loop forming a loop by coupling an input of the first feedback loop to the summer, wherein the second feedback loop having a programmable delay at its input,
    wherein the second feedback loop is to receive an output of the slicer and a clock signal, and wherein the programmable delay includes a first programmable delay to delay the output of the slicer and a second programmable delay to delay the clock signal; and
a wireless interface for allowing the processor to couple to another device.

18. The system of claim 17, wherein the first and second programmable delays are positioned such that feedback loops subsequent to the first feedback loop receive the delayed output of the slicer and the delayed clock signal.

19. The apparatus of claim 12, wherein the variable delay circuit is to receive an output of a digital delay cell, and wherein the digital delay cell is to delay an output of the slicer.

20. The apparatus of claim 12, wherein the non-first DFE tap path loop is to receive an output of the slicer and a clock signal.

21. The apparatus of claim 20, wherein the variable delay circuit includes a first programmable delay to delay the output of the slicer and a second programmable delay to delay the clock signal.

22. The apparatus of claim 21, wherein the first and second programmable delays have a delay greater than or equal to half of a Unit Interval (UI).

23. The apparatus of claim 21, wherein the first and second programmable delays have a delay less than or equal to one and a half of a Unit Interval (UI).

24. The apparatus of claim 21, wherein the first and second programmable delays have substantially equal delays.

\* \* \* \* \*